(12) United States Patent
Fischbach et al.

(10) Patent No.: US 8,659,189 B2
(45) Date of Patent: Feb. 25, 2014

(54) CONTROL SYSTEM FOR A MATERIAL HANDLING APPLICATION

(75) Inventors: Tab Fischbach, Duluth, GA (US); David den Haring, Atlanta, GA (US); David Oliver, Suwanee, GA (US); Jagdish Patel, Duluth, GA (US); Mike Szilagyi, Atlanta, GA (US); Sebastien Wolff, Atlanta, GA (US); Corey Hatchett, Alpharetta, GA (US)

(73) Assignee: Atronix Engineering, Inc., Norcross, GA (US)

( * ) Notice: Subject to any disclaimer, the term of this patent is extended or adjusted under 35 U.S.C. 154(b) by 0 days.

(21) Appl. No.: 13/354,920

(22) Filed: Jan. 20, 2012

(65) Prior Publication Data

US 2012/0187777 A1    Jul. 26, 2012

Related U.S. Application Data

(60) Provisional application No. 61/434,611, filed on Jan. 20, 2011.

(51) Int. Cl.
*H02H 11/00* (2006.01)

(52) U.S. Cl.
USPC ........................................ 307/326

(58) Field of Classification Search
USPC ................................ 307/147, 326
See application file for complete search history.

(56) References Cited

U.S. PATENT DOCUMENTS

| | | | |
|---|---|---|---|
| 5,318,167 A * | 6/1994 | Bronson et al. | 198/577 |
| 6,023,399 A | 2/2000 | Kogure | |
| 6,240,335 B1 | 5/2001 | Wehrung et al. | |
| 6,759,767 B2 | 7/2004 | Maskovyak et al. | |
| 6,876,888 B2 | 4/2005 | Locke | |
| 7,117,049 B2 | 10/2006 | Horn et al. | |
| 7,602,617 B2 | 10/2009 | Brandt et al. | |
| 7,836,217 B2 | 11/2010 | Tegnell et al. | |
| 7,959,474 B2 | 6/2011 | Beyer et al. | |
| 2002/0038981 A1 | 4/2002 | Brown et al. | |
| 2004/0182683 A1 | 9/2004 | Bigelow et al. | |
| 2007/0076333 A1 | 4/2007 | Battani | |
| 2008/0291607 A1 | 11/2008 | Braunstein et al. | |

FOREIGN PATENT DOCUMENTS

WO    WO 2011094899 A1    8/2011

OTHER PUBLICATIONS

"ConveyNet: The ConveyNet Family of Intelligent Conveyor Controls—Modular Networked Control," *InSight Automation*, 2001; 4 pages. http://www.insightautomation.cc/resources/literature/ConveyNetBrochure.pdf.

(Continued)

*Primary Examiner* — Carlos Amaya
(74) *Attorney, Agent, or Firm* — Faegre Baker Daniels LLP

(57) ABSTRACT

A distributed control system is provided having a plurality of control modules operative to control one or more output devices. A control module includes a first enclosure that houses a plurality of control terminals and a second enclosure that houses a controller for controlling an output device. A maximum voltage of the first enclosure is less than a threshold voltage level, and a maximum voltage of the second enclosure is greater than the threshold voltage level. A safety circuit of the control system includes a plurality of circuit segments connected in a series configuration to the control modules.

30 Claims, 9 Drawing Sheets

(56) References Cited

OTHER PUBLICATIONS

"MSR300 Modular Safety Control System," Rockwell Automation, 2006. http://samplecode.rockwellautomation.com/idc/groups/literature/documents/um/440r-um003_-en-p.pdf; 85 pages.

International Search Report and Written Opinion, issued by the United States Commissioner for Patents, dated May 16, 2012 for International PCT Application No. PCT/US2012/022055; 8 pages.

* cited by examiner

CONTROL SYSTEM FOR A MATERIAL HANDLING APPLICATION

RELATED APPLICATIONS

This application claims the benefit of U.S. Provisional Patent Application No. 61/434,611, filed Jan. 20, 2011, the disclosure of which is expressly incorporated by reference herein.

FIELD

The present disclosure relates to a control system for material handling applications, and more particularly to a distributed control system including a plurality of control modules for controlling one or more output devices.

BACKGROUND AND SUMMARY

Conventional control systems often include a central control panel that controls multiple output devices, such as motors, for example. The wiring for each output device is routed back to the central control panel. The output devices are often located up to hundreds of feet away from the central control panel. As such, extensive wiring and conduit are required between the output devices and the central control panels, thereby adding material and labor costs. For example, skilled installers may need to determine wiring schemes from electrical prints, run conduit through the system to the central control panel, route the wires from each device through the conduit, and terminate the wires on the connection in the control panel. Further, troubleshooting such a system often requires a skilled technician to analyze the electrical prints and trace complex wire paths.

Many conventional control systems require most or all of the mechanical system to be in place prior to starting electrical installation. For example, the machines and conduit are installed for the entire or most of the material handling system prior to routing and installing the electrical wires. Such sequential installation of mechanical and electrical components increases the total time required for installation of the system.

The central panel(s) of conventional control systems includes both high and low voltage devices and associated wiring housed in each panel. A panel containing energized high voltage devices may create an arc flash hazard. In many regions and countries, electrical safety codes regulate the safety of high voltage panels. For example, the National Electrical Code (NEC) 2011 and other standards of the National Fire Protection Association (NFPA) provides safety regulations for high voltage control systems in the United States. NFPA 70E, for example, requires the use of proper personal protective equipment (PPE) before an energized panel is opened for maintenance or troubleshooting.

Conventional control systems often include a high voltage safety circuit (e.g., emergency stop or "E-stop" circuit) with safety devices that are wired back to the central control panel. Each safety device is typically wired back to terminals of the central control panel, and the terminals are connected device to device to create a large series safety circuit. Such a large series configuration often leads to voltage drop issues due to the long wire runs. As such, these safety circuits often operate at high voltages, such as 120 volts alternating current (VAC), for example, in an effort to reduce voltage drop issues.

According to an embodiment of the present disclosure, a control module is provided for controlling an output device in a control system. The control module includes a first enclosure containing a plurality of control terminals, a second enclosure containing a controller operative to control an output device, and a communication interface configured to communicate control signals from control terminals of the first enclosure to the controller of the second enclosure to control the output device. A maximum voltage in the first enclosure is less than or equal to a threshold voltage level. A maximum voltage in the second enclosure is greater than the threshold voltage level.

According to another embodiment of the present disclosure, a distributed control system is provided including a main panel with a main controller and a plurality of control modules in communication with the main controller. Each control module is operative to control at least one output device of the control system. Each control module includes a first enclosure that houses a plurality of control terminals, a second enclosure that houses a controller operative to control an output device, and a communication interface operative to communicate control signals from control terminals of the first enclosure to the controller of the second enclosure to control the output device. A maximum voltage in the first enclosure is less than or equal to a threshold voltage level, and a maximum voltage in the second enclosure is greater than the threshold voltage level.

According to yet another embodiment of the present disclosure, a control system is provided including a first control module operative to control an output device of the control system and a second control module operative to control an output device of the control system. The first and second control modules each include a power supply. The control system includes a safety circuit having a plurality of circuit segments. Each circuit segment includes at least one safety device operative to disable an operation of the control system. A first circuit segment is powered by the power supply of the first control module and is coupled to the second control module to control power to the output device controlled by the second control module. The second circuit segment is powered by the power supply of the second control module.

According to still another embodiment of the present disclosure, an emergency stop circuit is provided that is connected to a plurality of control modules of a control system. The emergency stop circuit includes a first circuit segment having at least one safety device operative to disable an operation of the control system and a second circuit segment having at least one safety device operative to disable an operation of the control system. The second circuit segment is connected in series with the first circuit segment. The first circuit segment is coupled to and powered by a power supply of a first control module of the control system, and the second circuit segment is coupled to and powered by a power supply of a second control module of the control system. The first circuit segment is further coupled to the second control module and is operative to enable and disable an operation of the second control module.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
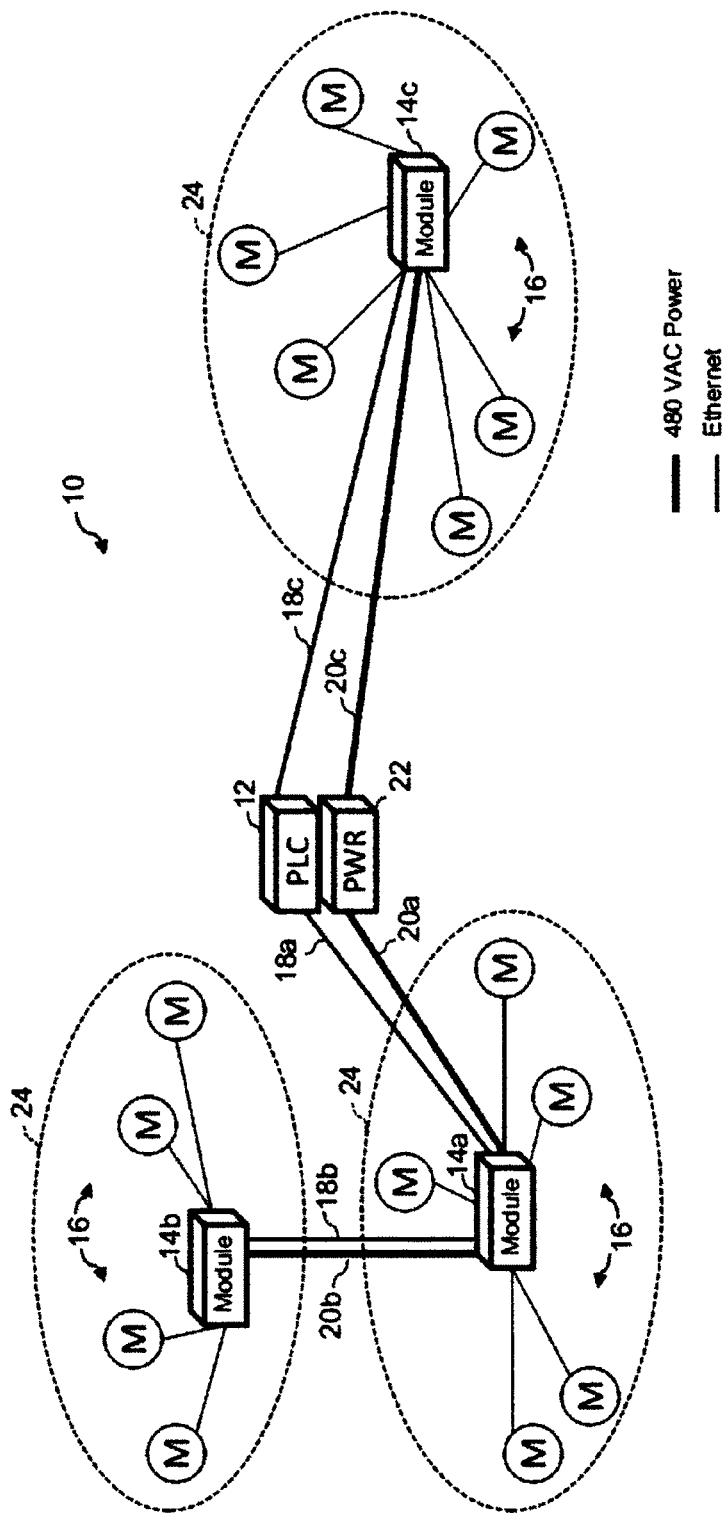
FIG. 1 illustrates an exemplary control system according to one embodiment including a plurality of control modules and output devices.

Referring initially to FIG. 1, an exemplary control system 10 is illustrated according to one embodiment. In the illustrated embodiment, control system 10 is a distributed control system 10 used for a material handling application in a manufacturing facility or a distribution center, for example. Control system 10 may be used for other suitable automation operations. Control system 10 includes a main controller 12, illustratively a programmable logic controller (PLC), located in a control box or panel that communicates with several control modules 14 distributed in zones 24 throughout the facility. A zone 24 illustratively includes a portion or section of the material handling system, such as one or more machines or a section of a conveyor belt, for example, and each zone 24 includes a control module 14 for controlling devices in the zone 24. Power is distributed from a power distribution panel 22 of the building or facility to the control modules 14 and to PLC 12.

Each control module 14, illustratively control modules 14a, 14b, and 14c, contains control parts and at least one controller for controlling one or more output devices 16 in the respective zone 24 of the material handling system, as described herein. PLC 12 is configured to provide control signals to control modules 14 for controlling the output devices 16 that are local to each zone 24. Each control module 14 communicates feedback and other signals to PLC 12, such as signals based on low voltage input/output (I/O) devices (e.g., sensors, etc.) and high voltage output devices 16 (e.g., motors) located in each respective zone 24. In another embodiment, additional PLCs 12 may be provided.

In the illustrated embodiment, each control module 14 controls one or more output devices 16 connected to the control module 14. Output devices 16 are illustratively high voltage electric motors 16, although other suitable output devices 16 may also be controlled by control module 14, such as pumps, generators, other actuators, etc. For example, motors 16 are used to drive conveyors, pumps, blowers, grinders, extruders, or other suitable devices of the material handling system. Each control module 14 includes one or more motor starters, variable frequency drives (VFDs), soft starters, and/or other suitable drives or controllers that drive the output devices 16, as described herein. Control modules 14 also controls one or more lower voltage I/O devices, such as photoeyes, pushbuttons, air-valves, actuators, audible devices (e.g., horns), visual devices (e.g., beacons), and other suitable I/O devices, as described herein in FIG. 2. In the illustrated embodiment, these I/O devices operate at low voltages, such as 24 VDC or other suitable low voltages. In another embodiment, control modules 14 are configured to control one or more I/O devices operating at 120 VAC. Control module 14 is mounted at any suitable location within the controlled zone 24 of the material handling system, such as to a frame or machine of the material handling system. For example, in an exemplary conveyor system embodiment, the enclosure(s) of control module 14 are sized to be mounted to the frame of the conveyor beneath the conveyor belt, as described herein in FIG. 4.

Network communication and power are illustratively provided to control system 10 in a daisy chained or sequenced configuration. As such, communication and power cables are not required to be routed from each control module 14 directly back to PLC 12 and power distribution panel 22, respectively. Further, wiring from I/O devices and output devices 16 in each zone 24 are routed back to the control module 14 located in that zone 24 rather than back to PLC 12. Control modules 14 are connected to each other and to the PLC 12 in a daisy chained configuration via network communication cables 18 for control and feedback communication between the control modules 14 and the PLC 12. In the illustrated embodiment of FIG. 1, a first communication cable 18a is routed between PLC 12 and a first control module 14a, a second communication cable 18b is routed between the first control module 14a and a second control module 14b, and so on. The second control module 14b thus communicates with PLC 12 through the first and second communication cables 18a, 18b that are linked together at the first control module 14a. Communication cables 18 are illustratively Ethernet cables 18, although other suitable communication protocols may be used.

In one embodiment, electrical power cables 20 are also daisy chained from power distribution panel 22 to control modules 14 for powering control modules 14. In particular, power is routed from panel 22 to first control module 14a via a first power cable 20a and from the first control module 14a to second control module 14b via a second power cable 20b, and so on. As described herein, power cables 20 are illustratively routed to a motor drive box 32 (see FIG. 2) of control modules 14 for powering a motor driver or controller. As described herein, PLC 12 receives power from a nearby control box 30 (see FIG. 2) of a control module 14 of control system 10. In one embodiment, the daisy chained power cables 20 serve to minimize branch circuit breakers and to reduce the lengths of the power cables 20 by routing power from module 14 to module 14 rather than back to the panel 22 from each module 14. Each chain or section of power cable 20 routed to control modules 14 operates at current levels up to a predetermined maximum, such as up to 30 Amps (A), for example. In the illustrated embodiment, power distribution panel 22 provides about 480 volts alternating current (VAC), three-phase, to control modules 14. Other suitable AC or DC power levels may be provided based on the power requirements of the application.

Control system 10 may include multiple branches of daisy-chained control modules 14, and each branch may include one or more zones 24. For example, power and controls may be routed from power panel 22 and PLC 12, respectively, directly to a control module 14 of each branch and then daisy-chained from the control module 14 of each branch to additional control modules 14 in the branch. In the illustrated embodiment of FIG. 1, a first branch includes modules 14a, 14b and a second branch includes module 14c. In one embodiment, one or more control modules 14 are connected to a network hub or repeater in the field that is connected to PLC 12 for control communication. See, for example, hub 69 illustrated in FIG. 2 and described herein.

In the illustrated embodiment, control system 10 provides a "plug and play" configuration for connecting additional control modules 14 to the network. In particular, an additional control module 14 is connected to control system 10 by connecting a communication cable 18 and a power cable 20 to a nearby control module 14 and to the additional control module 14 without wiring back to the PLC 12. As such, as additional zones 24 are added to the material handling system (e.g. a new section of a conveyor belt, etc.), the control system 10 is expandable by connecting an additional control module 14 to the existing daisy chained network of control modules 14 to control devices on the new zone 24. Upon connecting the additional control module 14 to the network, the software of PLC 12 is updated or re-programmed to provide controls to the additional control module 14 for controlling the output devices 16 on the new section of the material handling system. As such, a portion or subset of zones 24 of the material handling system may be installed and controlled with control modules 14 and PLC 12 prior to the complete installation of all zones 24 of the material handling system.

In the illustrated embodiment, with power and communication cables 18, 20 routed to control modules 14 in a daisy chained configuration, all other I/O, controls, and power connections of control modules 14 are localized in the respective zones 24 of the control modules 14. For example, I/O connections to low voltage I/O devices 54 (see FIGS. 2 and 3) contained within each zone 24 as well as power connections to high voltage output devices 16 (e.g. motors) are routed back to the respective control module 14 located in that zone 24. Further, the controls for each output device 16 provided with each control module 14 are local to the output device 16. As such, wiring from the output devices 16 and I/O devices 54 (see FIGS. 2 and 3) back to a main controller, such as PLC 12, and to power panel 22 is not required. Accordingly, long wire runs for I/O devices 54 and output devices 16 and conduits that route the wires runs back to a main controller are reduced or eliminated. In the illustrated embodiment, control system 10 does not include a central control panel that houses the main controller 12 and that receives wiring from all devices of control system 10 due to the daisy-chained configuration of control system 10. Rather, main controller 12 is provided in a control box, similar to control box 30 or motor box 32 of FIG. 2, and is connected to a single control module 14 or to a control module 14 of each branch of control system 10 for communicating with the control modules 14 of control system 10.

In one embodiment, the area of each zone 24 is set such that the wire/cable run lengths between the I/O devices 54 (see FIG. 2) and output devices 16 and the control modules 14 are less than or equal to a maximum distance. For example, in one embodiment, the local connections, I/O devices 54, and output devices 16 controlled by a local control module 14 are confined to an area or zone 24 of about 50 feet or less from the control module 14. In one embodiment, the area of each zone 24 is set such that the wire and cable runs do not require conduit according to local safety standards (e.g., UL508, NFPA70 (NEC), NFPA79, NFPA70E, etc.). Other suitable maximum wire and cable lengths may be provided. In a conveyor system, for example, control/power wiring and cables are routed along the conveyor structure with or without conduit based on requirements set forth in the local safety standards. In one embodiment, the wiring and cables are strapped to the conveyor structure without the use of conduit upon the wire/cable lengths being less than or equal to a maximum allowed length not requiring conduit protection, as set forth by the local safety standards.

Figure 2:
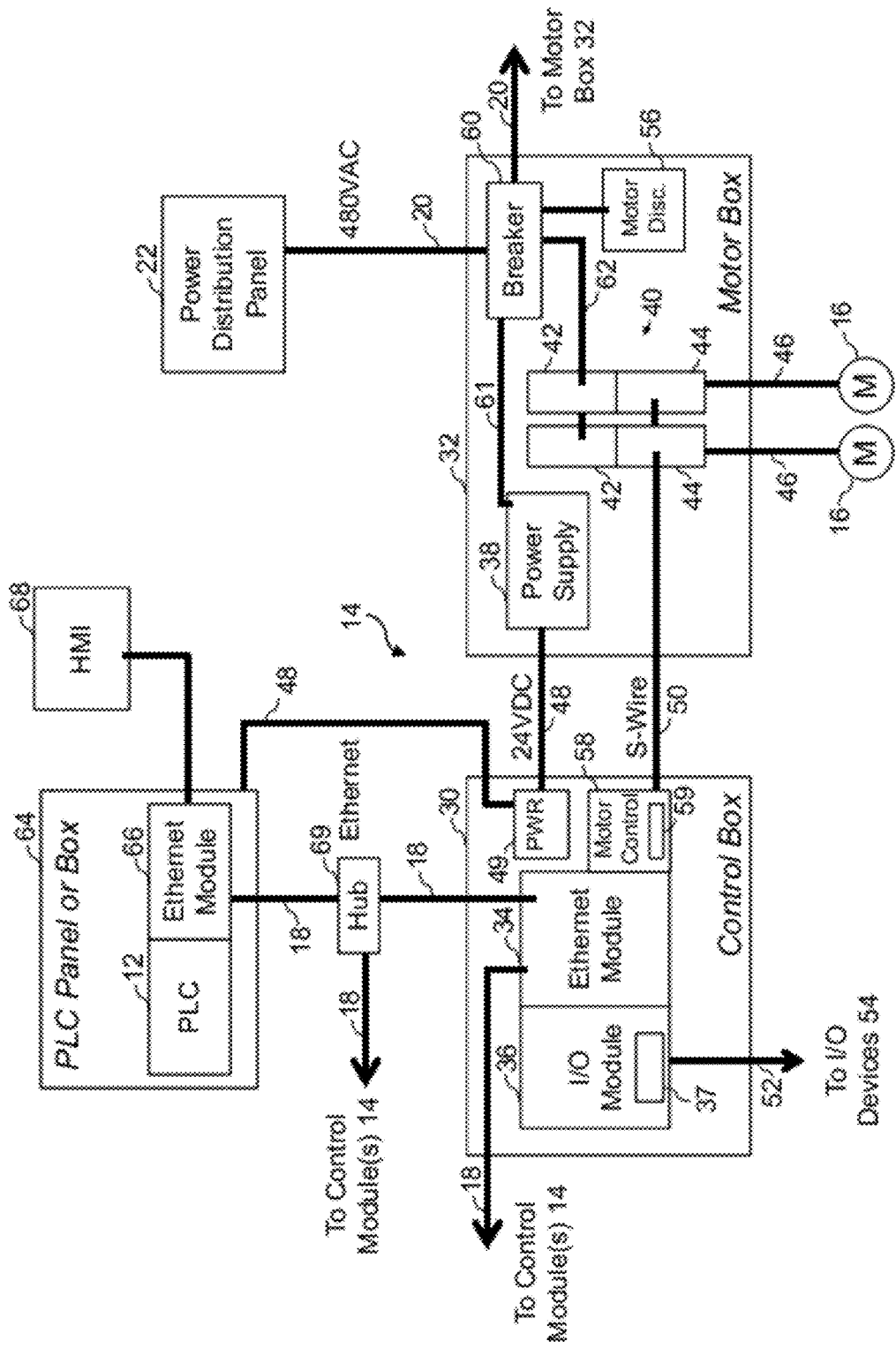
FIG. 2 illustrates an exemplary control module of the control system of FIG. 1 including a control box and a motor drive box.

Referring to FIG. 2, an exemplary control module 14 is illustrated. Control module 14 illustratively includes a control box 30 and a motor drive box 32. Control box 30 and motor drive box 32 each include any suitable enclosure, housing, or cabinet that houses control and power components and wiring. See, for example, the enclosure 114 illustrated in FIG. 4. Control box 30 and motor drive box 32 are made of polycarbonate, steel, or other suitable material. Control box 30 houses a communication module 34 and an input/output (I/O) module 36 in communication with the communication module 34. Communication module 34, illustratively an Ethernet communication module, transmits and receives control/feedback signals via communication cable 18 between PLC 12 and I/O module 34. I/O module 36 includes a plurality of I/O or control terminals 37 for connecting to I/O devices 54 of control system 10, such as sensors, transducers, actuators, lights, audio devices, and other suitable I/O devices provided in the local zone. A multi-wire communication cable 52 provides communication between I/O module 36 and output devices 54. I/O module 36 and communication module 34 cooperate to provide a communication interface between the I/O devices 54 and PLC 12. PLC 12 controls and receives feedback from I/O devices 54 in the respective zones 24 via I/O modules 36 of control boxes 30. In the illustrated embodiment, communication module 34 and I/O module 36 operate at 24 VDC power, although other operational power levels may be used. In one embodiment, control box 30 includes more than one I/O module 36 to accommodate connections to the local I/O devices 54. In one embodiment, a connection receptacle 70 is coupled between I/O module 36 and the local I/O devices 54, as described herein in FIG. 3.

Control box 30 illustratively includes a motor control or communication module 58 for communicating control signals to and receiving motor feedback from motor box 32 via cable 50. In particular, motor control module 58 includes a plurality of I/O or control terminals 59 in communication with communication module 34 and with motor controller 40 via cable 50. In one embodiment, motor control module 58 converts Ethernet control signals received from module 34 into control signals suitable for transmission over cable 50 to motor controller 40. Communication module 34, motor control module 58, and cable 50 cooperate to provide a communication interface between the motor box 32 (i.e., motor controller 40) and PLC 12. As such, PLC 12 controls and receives feedback from motor boxes 32 in the respective zones 24 (FIG. 1) via motor control modules 58 of control boxes 30.

As illustrated in FIG. 2, motor box 32 houses a motor controller 40, illustratively a motor starter assembly 40, including one or more motor starters 42 and corresponding motor I/O 44 that delivers power (e.g., three-phase 480 VAC)

to motors 16. Power, illustratively 480 VAC, is routed to motor box 32 via a power cable 20 from power distribution panel 22. Power may alternatively be routed from a nearby motor box 32. Power is routed to a circuit breaker 60 housed within motor box 32, and circuit breaker 60 routes the power to power supply 38 housed within motor box 32 via cable 61 and to motor starter assembly 40 via cable 62. Power supply 38 includes a regulator/rectifier that converts the high voltage, three-phase AC power to low voltage DC power (e.g. 24 VDC) that is routed to control box 30 via power cable 48 to provide a low voltage power source 49 at control box 30. Power source or supply 49, which receives power from power supply 38 of motor box 32, is used to power communication module 34, I/O module 36, motor control module 58, and other components of control box 30, as well as the I/O devices 54. As described herein in FIGS. 7-9, power source 49 also powers one or more circuit segments of an emergency stop circuit.

In the illustrated embodiment, each motor starter 42 includes a motor controller for driving and controlling on/off operation of motor 16. In one embodiment, motor controller 40 includes one or more variable frequency drives 42 (VFDs) for controlling the speed and torque of AC motors 16. Other suitable AC or DC drives may be provided.

Cable 50 is routed between control box 30 and motor box 32 for communicating control and feedback signals between motor control module 58 of control box 30 and motor controller 40 of motor box 32. An exemplary cable 50 is an 8-wire ribbon cable connected to the motor I/O 44 of motor starters 42. Each motor starter 42 of controller 40 drives a motor 16 based on the control signals provided with PLC 12 through module 34 and module 58 of control box 30. In an alternative embodiment, module 36 is hardwired to motor controller 40 for providing control signals to the motor starters 42. In another embodiment with one or more VFDs 42 as motor controller 40, hardwired signals are communicated between the VFDs 42 of motor box 32 and the motor control module 58 or other module of control box 30.

Power from motor box 32 is selectively routed from motor starters 42 to motors 16 via power cords or cables 46 to drive motors 16 based on control signals received via cable 50. In one embodiment, motors 16 are located within a predetermined distance from motor box 32, as described herein. In one embodiment, the installation of conduit for housing motor cord 46 is optional when motors 16 are within the predetermined distance based on local regulatory standards. In one embodiment, the predetermined distance between motors 16 and motor box 32 is less than or equal to about 50 feet. For example, motor cord 46 has a length of up to about 50 feet. Other suitable distances and cable lengths may be provided.

Motor box 32 illustratively includes two motor starters 42 for controlling two motors 16. Alternatively, motor box 32 houses fewer or additional motor starters 42 for controlling the motors 16 in the zone 24 (FIG. 1). In one embodiment, motor box 32 may include up to eight motor starters 42 for controlling eight motors 16. Motor starters 42 are illustratively connected to module 58 of control box 30 in a daisy-chained arrangement. For example, control communication is routed from control box 30 to a first motor starter 42 via a first cable 50 and from the first motor starter 42 to a second motor starter 42 via a second cable 50, and so on. Power from breaker 60 is also illustratively routed to motor starters in a daisy-chained configuration. In one embodiment, multiple sizes of motor boxes 32 are available. For example, a first, small motor box 32 is configured to house up to four or five motor starters 42, and a second, larger motor box 32 is configured to house up to seven or eight motor starters 42. Other sizes and capacities of motor box 32 may be provided.

In one embodiment, a control module 14 includes multiple motor boxes 32 provided in a single zone 24 (see FIG. 1) for controlling additional motors 16. In one embodiment, each motor box 32 is connected to the control box 30 in a daisy chained configuration. In particular, control communication is routed from control box 30 to a motor starter assembly 40 of a first motor box 32 via a first cable 50 and from the first motor box 32 to a motor starter assembly 40 of a second motor box 32 via a second cable 50, and so on. Similarly, power is routed from power distribution panel 22 to the first motor box 32 via a first cable 20 and from the first motor box 32 to the second motor box 32 via a second cable 20, and so on. As such, an additional motor box 32 may be added in the zone 24 by connecting a power cable 20 to a nearby motor box 32 and a communication cable 50 to a nearby motor box 32 or control box 30. Motor boxes 32 may alternatively include drivers and/or other controllers for controlling other suitable output devices, such as pumps, generators, other actuators, etc.

In one embodiment, power is routed from distribution panel 22 directly to each control module 14 of control system 10 (FIG. 1) and daisy chained to the motor boxes 32 within each control module 14. In particular, power is routed from panel 22 to a first motor box 32 of a set of motor boxes 32 of a control module 14 and daisy chained from the first motor box 32 to the remaining motor boxes 32 of the set of motor boxes 32 of the control module 14. As such, the number of branch circuit breakers 60 receiving power directly from power distribution panel 22 is minimized.

In an exemplary embodiment, conduit is used to house the power cable 20 from the power distribution panel 22 to the control modules 14. Exemplary conduit includes flexible conduit or flexible PVC. In one embodiment, motor cords 46 consist of 12 gauge or 14 gauge, four conductor cable, although other suitable cords 46 may be used. Conduits are optionally used to route motor cords 46, and the use of conduit may depend on the length of motor cords 46, as described herein. Alternatively, cords 46 may be fastened directly to the material handling structure, such as to a conveyor frame, with any suitable fastener. In another embodiment, cords 46 are routed through a strut channel coupled to the material handling structure, such as strut channel 102 of a mounting assembly 100 (see FIG. 4) described herein.

PLC 12 is illustratively provided in a PLC box or panel 64 that also houses a communication module 66. In one embodiment, PLC panel 64 is the same size and structure as a control box 30 or motor box 32 and is mounted adjacent to a control module 14 of control system 10. In the illustrated embodiment, PLC panel 64 receives 24 VDC power from the power source 49 of control box 30 via power cable 48 or directly from power supply 38 of motor box 32. Communication module 66, illustratively an Ethernet module 66, is operative to communicate control and feedback signals between control modules 14 and PLC 12. An optional hub 69 is configured to route communication from PLC 12 to multiple branches of control modules 14. A human-machine interface 68, such as a graphical user interface (e.g., touchscreen, display with keyboard or other input device, etc.), is provided to allow an operator to input controls for control system 10 and to monitor operations.

In the illustrated embodiment, control box 30 contains only low voltage components. In particular, all wiring and components (e.g. controls, safety relays, modules, control terminals, communication hardware) within control box 30 have an operating voltage of less than or equal to a predetermined low voltage level. In one embodiment, the predetermined voltage level is about 50 VDC. Other suitable predetermined low voltage levels may be used, such as 24 VDC, etc. In the illustrated embodiment, the predetermined voltage level is set such that the potential for an arc flash hazard and/or other electrical hazard from an opened or accessed control box 30 is reduced or eliminated. In one embodiment, an operator or technician is not required (e.g., based on local safety regulations) to remove power to control box 30 or to wear arc flash protection, such as protective clothing, eye protection, gloves, etc., before opening and/or accessing the control enclosure 30 for maintenance and troubleshooting due to the low voltage. Further, control communication troubleshooting and other maintenance may be performed in control box 30 while power to control box 30 is enabled without bypassing installed safety mechanisms, such as a safety interlock, for example. In one embodiment, the predetermined maximum voltage level is set based on high voltage safety standards (e.g., UL508, NFPA70 (NEC), NFPA79, NFPA70E, etc.) such that personal protective equipment (PPE) is not required when opening control box 30. In the illustrated embodiment, the components and wiring within control box 30 operate at about 24 VDC, although other suitable low voltages may be implemented. In an alternative embodiment, control box 30 includes components operating at high voltages, such as I/O module 36 operating at a high voltage (e.g., 120 VAC) for controlling high voltage (e.g., 120 VAC) I/O devices 54, for example.

In the illustrated embodiment, motor box 32 contains high voltage components, including some components operating at 480 VAC, for example. In particular, some or all wiring and components (e.g. motor controls, power supplies, drives, breakers, other hardware) within motor box 32 have a voltage level that is greater than or equal to the predetermined voltage level, such as 50 VDC, for example, as described herein. As such, an operator or technician may be required (e.g., based on local safety regulations) to wear safety protection (e.g. PPE for arc flash) and/or to remove power to the motor box 32 before opening and/or accessing the motor box 32 due to potential high voltage hazards. With this configuration, motor box 32 and control box 30 are separated such that high voltage components (i.e., components operating at a voltage above a predetermined level) are only contained in motor box 32 and only low voltage components (i.e., components operating at a voltage below a predetermined level) are contained in control box 30. As such, control box 30 may be opened for maintenance or for troubleshooting communications with PLC 12, motor box 32, and I/O devices 54 without removing power to control box 30 (or to all or a portion of control system 10 of FIG. 1). Further, arc flash protective clothing and gear may be optional based on local safety standards when opening control box 30 due to the exclusively low voltage components and wiring contained within control box 30.

In one embodiment, boxes 30, 32 of FIG. 2 have a National Electrical Manufacturers Association (NEMA) rating of NEMA 1, NEMA 12, or another suitable rating. In one embodiment, the short circuit current rating (SCCR) for box 32 is 22 kilo-amps at 480 VAC, although another suitable SCCR rating may be provided. In one embodiment, control boxes 30, motor boxes 32, and PLC panel 64 are about 18 inches in width, 15 inches in height, and 8 inches in depth, although other suitable enclosure sizes may be provided. In another embodiment, one or more motor boxes 32 are larger in size to accommodate additional motor starters 42.

A motor disconnect 56 is provided in motor box 32 and is configured to remove power to motor starters 42 and the respective motors 16 upon actuation or triggering. In one embodiment, motor disconnect 56 is configured to remove power from all motor starters 42 of motor box 32, although multiple motor disconnects 56 alternatively may be provided each configured to remove power from an individual motor starter 42. Motor disconnect 56 includes a lever, switch, or other actuator coupled externally to motor box 32 to allow an operator to actuate the motor disconnect 56 to remove power. Motor disconnect 56 is lockable to prevent unauthorized personnel from enabling or disabling power at motor boxes 32.

Motor disconnect 56 is illustratively coupled to circuit breaker 60 such that when motor disconnect 56 is actuated, the circuit breaker 60 cuts power to motor starters 42 (and therefore to motors 16). Motor disconnect 56 may alternatively be coupled to fuses for protecting power. An exemplary motor disconnect 56 is a rotary disconnect. In one embodiment, power supply 38 remains energized upon motor disconnect 56 of motor box 32 being tripped, thereby providing continuous power to control box 30 while motor controller assembly 40 and motors 16 are deactivated. In this embodiment, communication between PLC 12 and control box 30 may be observed and tested with motors 16 and motor controller assembly 40 disabled and inactive. In one embodiment, power wires within motor box 32 that remain energized in the event of motor disconnect 56 being turned off are color coded (e.g. orange or another suitable color). In one embodiment, additional motor boxes 32 of a control module 14 that are daisy-chained to a first motor box 32 receiving power from panel 22 are provided with a motor disconnect 56.

In one embodiment, additional motor disconnects 56 are installed near a motor 16 when the motor 16 is positioned a distance away from motor boxes 32. For example, when a motor 16 is out of sight or a certain distance (e.g. 25 feet or more) from the controlling motor box 32, a motor disconnect 56 is installed near or adjacent the motor 16, such as within five feet of the motor 16. The disconnect 56 may be coupled to the power cable 46 or to the motor 16. As such, quicker access to a motor disconnect 56 is provided to an operator for disabling motor(s) 16. In the illustrated embodiment, motor disconnect 56 is installed to comply with local safety standards and regulations (e.g., standards set forth by the NFPA).

In the illustrated embodiment, power cables 46 and communication cables 18, 52 of control system 10 include plug connectors for connecting to control boxes 30, motor boxes 32, and other devices of control system 10. See, for example, plug connectors 90 of communication cable 52 and plug connectors 76 of cables 72 of FIG. 3 described herein. In one embodiment, the plug connectors allow electrical connections to be made without cutting, stripping, and crimping wires. The plug connectors are illustratively quick-disconnect connectors (e.g., M12 connectors) adapted to be removed from corresponding connectors/sockets without the use of tools. In one embodiment, the plug connectors are keyed to facilitate proper orientation of the connector when mating with a corresponding connector. Other connections may also include plug connectors, such as cable connections to I/O devices 54 and output devices 16, connections between cables 48, 50, and boxes 30, 32, and E-stop connections, as described herein.

Figure 3:
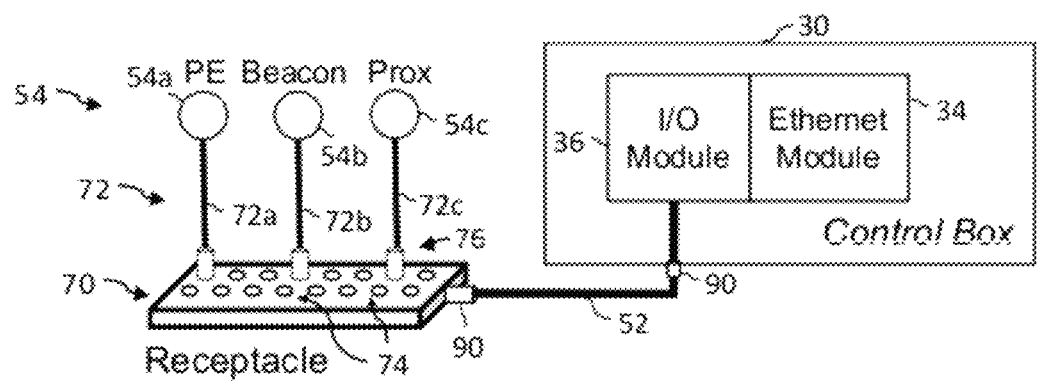
FIG. 3 illustrates an exemplary receptacle that provides a connection interface between I/O devices and the control box of FIG. 2.
Figure 7:
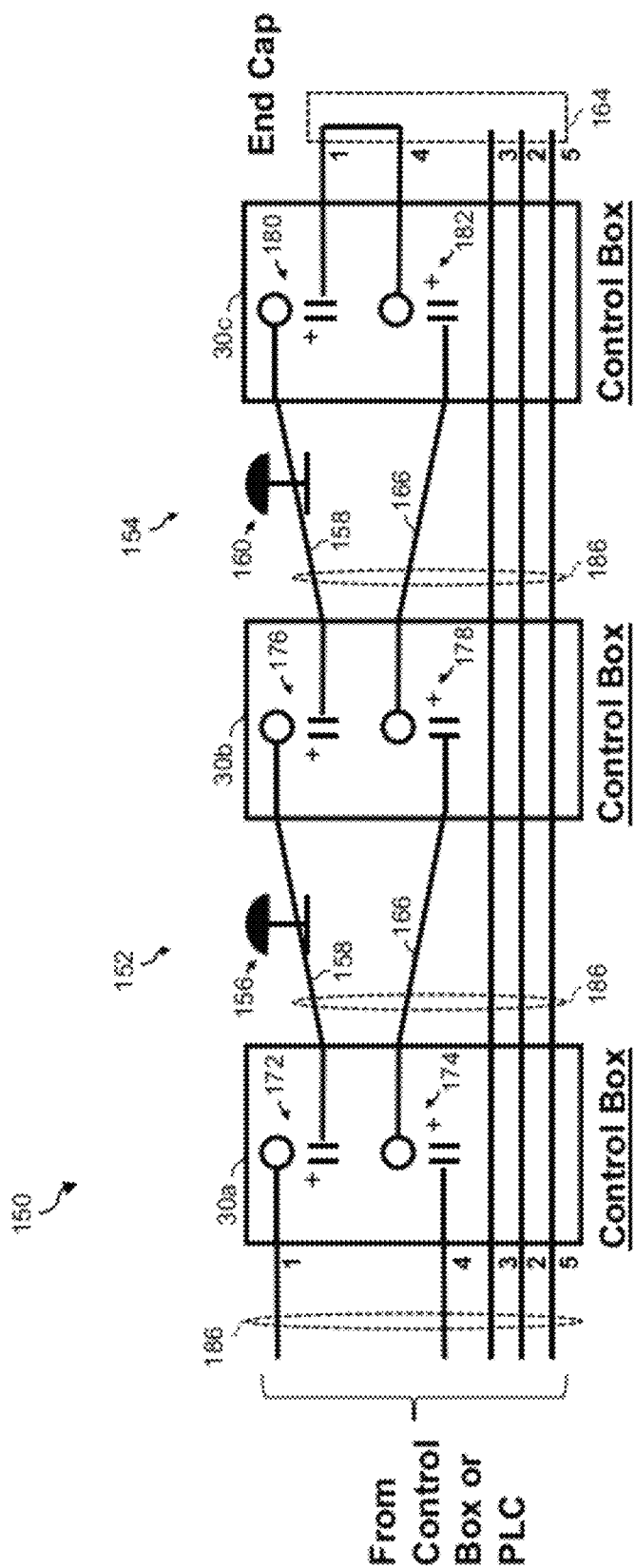
FIG. 7 illustrates an exemplary safety circuit of the control system of FIG. 1.

As illustrated in FIG. 3, a connection receptacle 70 serves as a connection interface between I/O devices 54 in the field and control box 30. Receptacle 70 provides a field termination block for I/O devices 54 to allow for localized troubleshooting, wiring, and maintenance of communication between I/O devices 54 and control box 30. Receptacle 70 is connected to I/O module 36 of control box 30 via communication cable 52 and to I/O devices 54 via communication cables 72 to facilitate communication between I/O devices 54 and I/O module 36. As illustrated in FIG. 7 and described herein, safety devices of an E-stop circuit 150 are also connected with control boxes 30 of control system 10 via one or more receptacles 70.

Referring to FIG. 3, an end of each communication cable 52, 72 illustratively includes a connector 90, 76, respectively, adapted to mate with a corresponding connector or socket of receptacle 70. As such, cables 52, 72 are removable from receptacle 70 and are replaceable without manual wiring to receptacle 70. The other end of communication cable 52 illustratively also includes a connector 90 for coupling to a corresponding port of control box 30, although communication cable 52 may alternatively be routed directly to I/O module 36 of control box 30 without a connector interface at control box 30. In one embodiment, connectors 90 include bulkhead connectors. Similarly, the other ends of cables 72 may include connectors for coupling to a port or connector of the respective I/O device 54.

Receptacle 70 includes several connectors or sockets 74 serving as I/O ports and coupling to connectors 76 of cables 72 routed from I/O devices 54. Receptacle 70 includes internal circuitry that routes the conductors of communication cables 72 to the conductors of communication cable 52 for communication therebetween. Similarly, the conductors of communication cable 52 are routed to appropriate connection terminals of I/O module 36, thereby allowing modules 34, 36 of control box 30, and thus PLC 12, to communicate with output devices 54. Additional receptacles 70 and/or cables 52 may be provided to accommodate connections to output devices 54. In one embodiment, each receptacle 70 includes connectors 74 accommodating up to 16 I/O devices 54, although other capacities may be provided. Exemplary I/O devices 54 illustrated in FIG. 3 include a photo eye 54a, a beacon 54b, and a proximity switch 54c that are connected to receptacle 70 via communication cables 72a, 72b, 72c, respectively. In one embodiment, connectors 74, 76, and 90 of FIG. 3 are quick-disconnect M12 connectors, although other types of connectors may be provided.

Receptacle 70 is illustratively mounted in the field, such as near I/O devices 54 located within zone 24. For example, receptacle 70 may be mounted to the frame of a conveyor or other portion of the material handling system. In one embodiment, communication cables 52, 72 have a maximum length of about 50 feet, although other maximum lengths may be used. In one embodiment, conduit is not required based on local safety standards for cables 52, 72 due to the low operational voltage (e.g. 24 VDC) and/or to the cable lengths being less than or equal to a maximum length (e.g., 50 feet).

Control modules 14 of FIG. 2 may include various suitable mounting configurations. In one embodiment, control boxes 30 and motor boxes 32 are wall-mount boxes configured to mount to a vertical wall or an angled wall. In one embodiment, control boxes 30 and motor boxes 32 are configured to mount to a horizontal surface, as illustrated in FIG. 4 and described herein.

Figure 4:
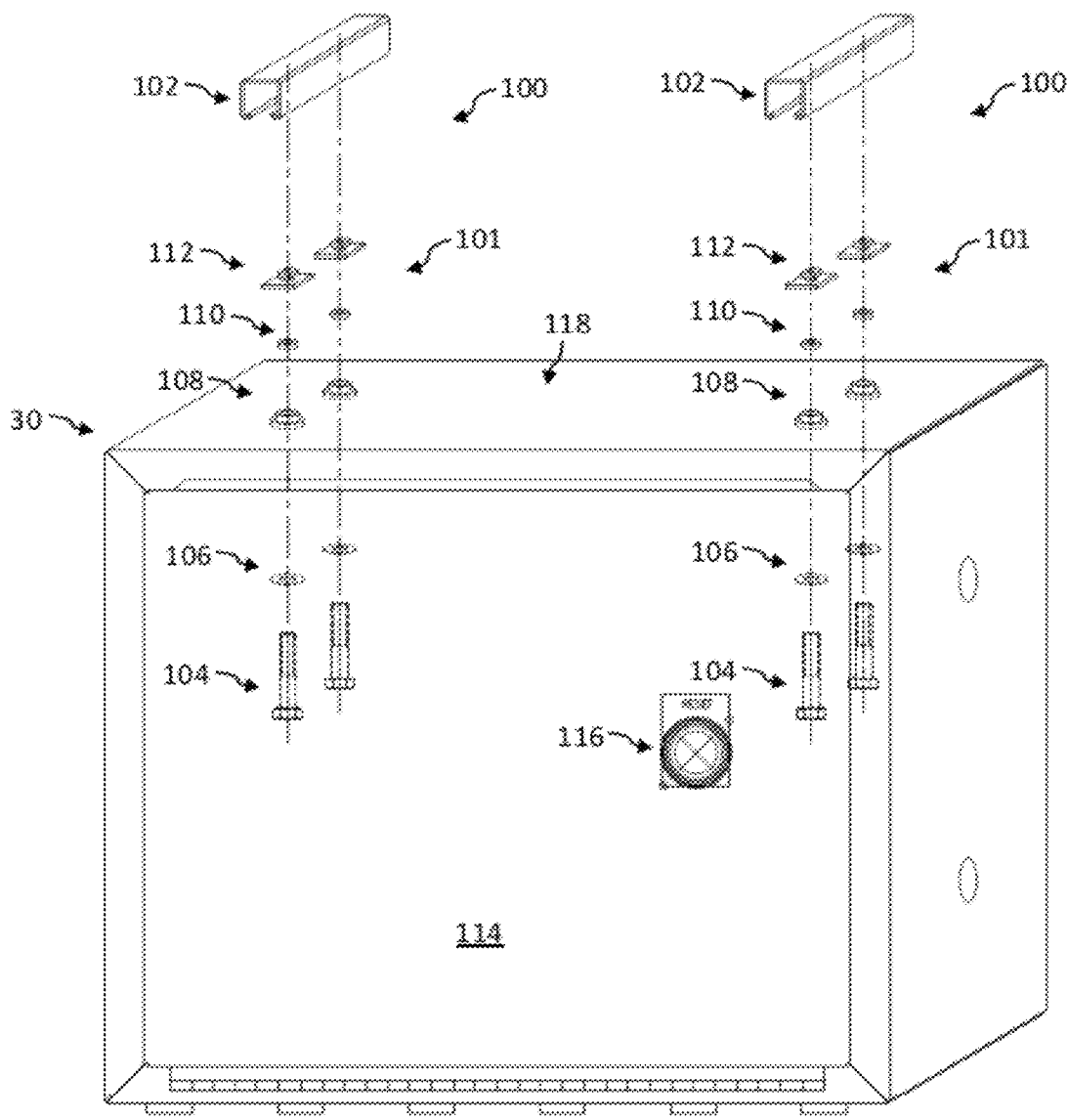
FIG. 4 illustrates an exemplary control box of the control module of FIG. 2 including an exemplary mounting assembly.

Referring to FIG. 4, exemplary mounting assemblies 100 are illustrated for mounting a control box 30 (or a motor box 32 of FIG. 2) to a mounting surface or structure. Mounting assemblies 100 are illustratively coupled to a top wall 118 of control box 30 for mounting control box 30 beneath a horizontal surface or structure. An exemplary horizontal mounting structure includes a frame of a conveyor belt or other machine of a material handling system. For example, brackets 102 of mounting assemblies 100 are mounted to a mounting surface of the conveyor belt frame such that control box 30 is positioned substantially beneath the conveyor belt. Other structures of the material handling system may be used for mounting assemblies 100. Further, mounting assemblies 100 may alternatively be coupled to another wall of control box 30 for mounting control box 30 to a vertical or angled surface or structure. In FIG. 4, control box 30 illustratively includes a reset actuator 116 (e.g., pushbutton) coupled to a door 114 or other suitable wall that is operative to reset power to control box 30 upon actuation.

Figure 5:
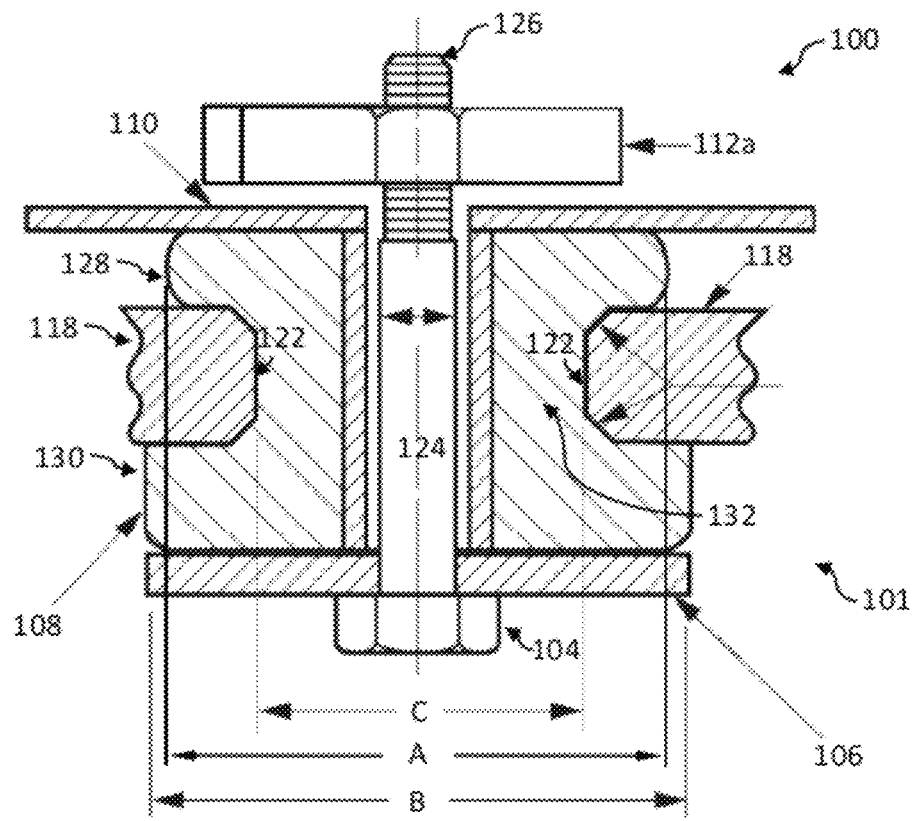
FIG. 5 illustrates a cross-sectional view of another exemplary mounting assembly for the control module of FIG. 2.

As illustrated in FIGS. 4 and 5, each mounting assembly 100 includes one or more sets of fasteners 101 that couple control box 30 to a mounting bracket 102. Mounting brackets 102 are illustratively strut channels 102, although other suitable brackets 102 may be provided. While each mounting assembly 100 of FIG. 4 includes two sets of fasteners 101 that couple control box 30 to two mounting brackets 102, fewer or additional sets of fasteners 101 may be used. Each set of fasteners 101 includes an elongated bolt or screw 104 that is received by a washer 106, an isolation pad 108, a washer or spacer 110, and a nut 112. Nut 112 is sized to couple to mounting bracket 102, as described below. Isolation pad 108 includes an interior opening for receiving screw 104 and an outer surface that is received by an aperture of a wall, illustratively top wall 118, of control box 30. Screw 104 illustratively includes a hex cap screw, and washer 106 serves as a flat cinch washer 106 between the head of screw 104 and isolation pad 108. Washer 110, illustratively a fender washer 110, serves as a spacer between nut 112 and isolation pad 108 and provides a distributed compressive force on isolation pad 108 upon nut 112 being tightened. Other suitable fasteners 101 may be provided for mounting assembly 100.

Isolation pads 108 are illustratively formed of rubber and serve as shock absorbers to reduce the vibrations from the mounting structure that translate to control box 30. In other words, isolation pads 108 facilitate the isolation of control box 30 from vibrations of the mounting structure, thereby reducing the likelihood of damaged components or loosened connections within control box 30.

Referring to FIG. 5, an exemplary assembled mounting assembly 100 is illustrated. Isolation pad 108 includes a first flanged portion 128, a second flanged portion 130, and a neck portion 132 extending between the flanged portions 128, 130. An outer diameter A of the first flanged portion 128 is smaller than an outer diameter B of the second flanged portion 130 and larger than an outer diameter C of the neck portion 132. During assembly, isolation pad 108 is lodged from the inside of control box 30 (FIG. 4) into an aperture formed by edges 122 of wall 118. In particular, first flanged portion 128 is configured to deform and squeeze through the aperture formed in wall 118 until neck portion 132 is lodged between edges 122 and second flanged portion 132 abuts the underside of wall 118. Screw 104, which includes a shaft portion 124 with a threaded end 126, is inserted through washer 106 and isolation pad 108 from the inside of control box 30, and threaded end 126 receives washer 110 and nut 112a on the outside of control box 30. The tightening of nut 112a on threaded end 126 of screw 104 causes washers 106, 110 to compress isolation pad 108, thereby securing fasteners 101 to control box 30. Nut 112a of FIG. 5 illustrates another suitable variation of nut 112 of FIG. 4 that is coupled to mounting bracket 102.

Isolation pad 108 of FIGS. 4 and 5 is designed such that in the event the pad 108 becomes dislodged from the aperture formed in wall 118 with screw 104 removed, the pad 108 is configured to fall into the interior of control box 30 due to the diameter A of first flanged portion 128 being smaller than the diameter B of second flanged portion 130. As such, upon application of a force, first flanged portion 128 is configured to deform and squeeze through the aperture of wall 118 with screw 104 removed from pad 108, thereby allowing pad 108 to fall within control box 30. In the illustrated embodiment, second flanged portion 130 is sized such that it does not fit through the aperture of wall 118.

Figure 6:
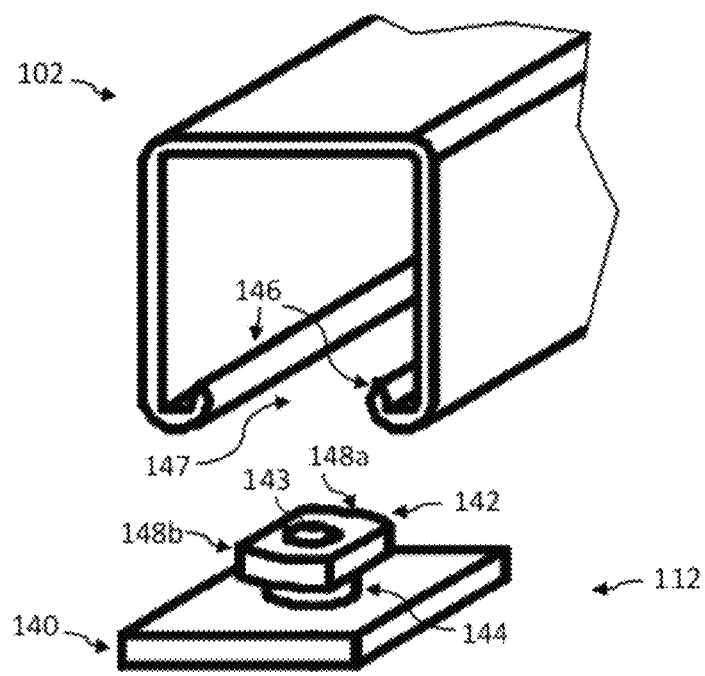
FIG. 6 illustrates an exemplary coupling mechanism of the mounting assembly of FIG. 4.

Referring to FIG. 6, an exemplary nut 112 of mounting assembly 100 of FIG. 4 is illustrated for coupling to mounting bracket 102, illustratively a strut channel 102. Strut channel 102 includes a pair of opposing lips or flanges 146 extending along the length of strut channel 102 and defining a longitudinal slot 147 therebetween. Nut 112 includes a body portion 140, a head portion 142, and a collar portion 144 extending between body and head portions 140, 142. A threaded opening 143 extends through body portion 140, head portion 142, and collar portion 144 for receiving threaded end 126 of screw 104 (see FIG. 5). With nut 112 and strut channel 102 aligned as illustrated in FIG. 6, strut channel 102 is configured to receive head portion 142 of nut 112 through slot 147 such that body portion 140 abuts flanges 146. In this configuration, nut 112 is rotated such that flanges 146 of strut channel 102 are positioned between body portion 140 and ends 148a, 148b of head portion 142, thereby securing nut 112 to strut channel 102. As such, control box 30 (FIG. 4) is secured to strut channel 102 via the cooperation of nuts 112 and strut channels 102. In another embodiment, head portion 142 is rotatable relative to body portion 140. In this embodiment, upon positioning body portion 140 against the bottoms of flanges 146 of strut channel 102, head portion 142 is rotated 90 degrees (i.e., a quarter turn) such that ends 148a, 148b extend over the tops of flanges 146 to thereby secure nut 112 to strut channel 102.

Referring to FIG. 7, an exemplary emergency stop (E-stop) or safety circuit 150 is illustrated for use with control system 10 of FIG. 1. E-stop circuit 150 is illustratively a direct current safety circuit operating at a low voltage level. E-stop circuit 150 illustratively operates at about 24 VDC, although other suitable low-voltage levels (i.e., less than or equal to about 50 volts) may be used. In another embodiment, E-stop circuit 150 operates at a high-voltage level, such as 120 VAC, for example. E-stop circuit 150 includes a plurality of circuit segments connected in series to control modules 14 (FIG. 2), illustratively to control boxes 30, and each circuit segment is powered by a power supply of a respective connected control box 30. E-stop circuit 150 illustratively includes a first circuit segment 152 connected between a control box 30a and a control box 30b and a second circuit segment 154 connected between control box 30b and a control box 30c. As such, E-stop circuit 150 has a daisy chained configuration with one or more circuit segments (e.g., 152, 154) connected in series from control box 30 to control box 30. While two series circuit segments 152, 154 are illustrated in FIG. 7, fewer or additional E-stop circuit segments may be provided with E-stop circuit 150, for example, as needed based on the number of control boxes 30 connected to E-stop circuit 150.

Each circuit segment 152, 154 includes one or more power cables 186 and at least one safety device 156, 160, respectively, that is operative to enable and disable one or more operations of control system 10 (FIG. 1). Safety devices 156, 160 are mounted on or adjacent a machine, operator station, and/or other section of the material handling system accessible to an operator. In the illustrated embodiment, safety devices 156, 160 include mechanically (e.g., manually) actuated switches that, upon actuation, disable the operation of one or more output devices 16 (FIG. 1) of control system 10, such as by causing the removal of power to the output devices 16. In one embodiment, actuation of one of the safety devices (e.g., 156, 160) of E-stop circuit 150 is configured to disable operation of all output devices 16 (FIG. 1) of control system 10, although a subset of output devices 16 may alternatively be disabled depending on the configuration. Safety devices 156, 160 include one or more electrical contacts that are opened and closed with movement of the actuator of the device 156, 160. Safety devices 156, 160 may include pushbuttons, pull-cords, handles, foot pedals, light curtains, safety gates, safety scanners, and other suitable actuators. While each circuit segment 152, 154 illustratively includes one respective safety device 156, 160, additional safety devices may be provided and connected in series with safety devices 156, 160.

Cables 186 include multiple power lines or wires connected to control boxes 30 and to safety devices 156, 160 for routing safety circuit control power. In particular, circuit segment 152 includes a supply power wire 158 that routes power from a switch 172 of control box 30a to safety device 156 and from safety device 156 to a switch 176 of control box 30b, and circuit segment 154 includes a supply power wire 158 that routes power from switch 176 of control box 30b to safety device 160 and from safety device 160 to a switch 180 of control box 30c. Similarly, circuit segment 154 includes a return power wire 166 that routes power from a switch 182 of control box 30c to safety device 160 to a switch 178 of control box 30b, and circuit segment 152 includes a return power wire 166 that routes power from switch 178 of control box 30b to safety device 156 to a switch 174 of control box 30a. Supply wires 158 form a part of a supply power line 1 of E-stop circuit 150 that routes power (e.g., 24 VDC power) from control box 30 to control box 30. Return wires 166 form a part of a return power line 4 that routes the return power from control box 30 to control box 30 to complete the E-stop circuit 150. In the illustrated embodiment, cables 186 are multi-wire cables including respective power wires 158, 166 and end connectors (e.g, see connectors 210, 212 of FIG. 9) for coupling to the respective safety devices 156, 160 and to control boxes 30. Cables 186 illustratively include additional wires or lines 2, 3, 5 that are routed from control box 30 to control box 30. In one embodiment, wires 2, 3, 5 are not utilized, although other embodiments may utilize one or more of wires 2, 3, 5 for branch circuit configurations (see FIGS. 8 and 9 described herein) or other suitable configurations.

Safety switches 172-182 include relays or other suitable switches that, when activated, are operative to couple supply power (power 49) of the respective control box 30 to the outgoing power wire of the corresponding cables 186. Control boxes 30 illustratively each include a switch 172, 176, 180 coupled to supply power line 1 and a switch 174, 178, 182 coupled to return power line 4. In the illustrated embodiment, switches 172, 176, 180 serve to reduce voltage drop of E-stop circuit 150 by coupling each circuit segment to the respective internal power source 49 (FIG. 2), and switches 174, 178, 182 allow power to output devices 16, i.e., power is removed from each output device 16 coupled to line 4 when line 4 is tripped. Electrical contacts of switches 172-182 may be normally open or normally closed depending on the configuration, and switches 172-182 are activated based on an energized power line 1, 4, although other suitable switch control configurations of E-stop circuit 150 may be provided.

Figures 10A, 10B:
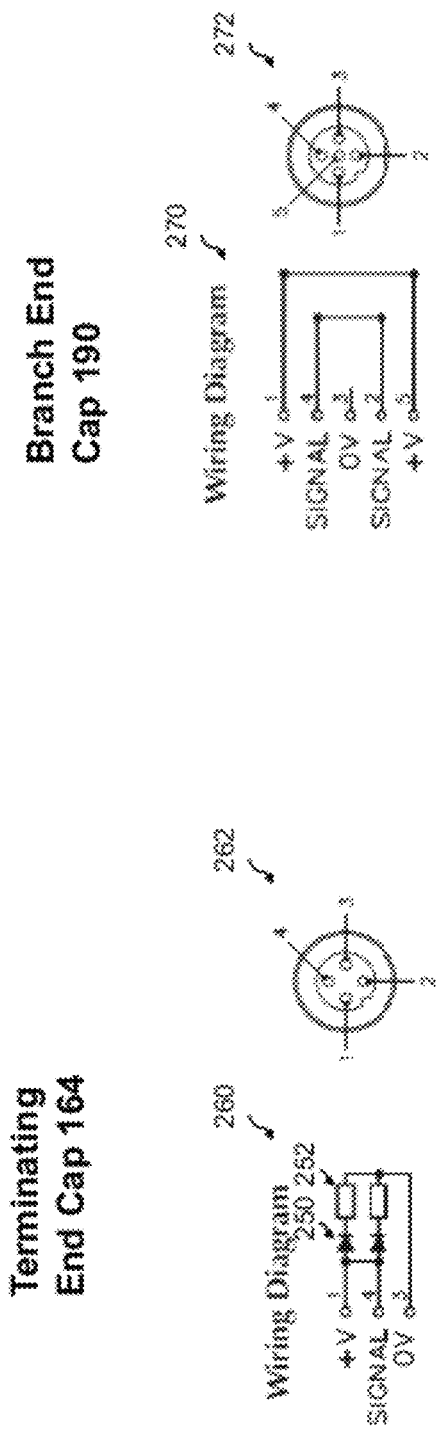
FIG. 10A illustrates an exemplary terminating end cap of the branch circuit of FIG. 8.
FIG. 10B illustrates an exemplary end cap of the branch circuit of FIG. 8.

E-stop circuit 150 further includes an end cap or plug 164 that connects supply power line 1 to return power line 4 at the end of the series E-stop circuit 150, thereby completing the E-stop circuit 150. End cap 164, which includes a jumper plug, connector, or other suitable terminating cap, is sized to couple to a corresponding port of a control box 30 (illustratively control box 30c) that is also adapted to receive a connector of an outgoing power cable 186. An exemplary wiring diagram 260 and pin schematic 262 of end cap 164 are illustrated in FIG. 10A. In FIG. 10A, end cap 164 includes four pins (1, 2, 3, 4) that connect to respective lines 1, 2, 3, 4 of FIG. 7. The E-stop circuit power from line 1 of FIG. 7 is received by end cap 164 at pin 1 and is routed to pin 4 and to return line 4 of FIG. 7. End cap 164 includes a pair of light-emitting diodes (LEDs) 250 in series with current limiting resistors 252. LEDs 250 provide indicator lights to indicate the status of lines 1 and 4 of E-stop circuit 150, i.e., for status and troubleshooting. Pin 3 coupled to line 3 provides zero volts common for operation of LEDs 250.

In operation, control box 30a receives a power signal (e.g. 24 VDC) over line 1 from a main controller (e.g., PLC panel 64 of FIG. 2), an adjacent control box 30, or another suitable E-stop device or controller over multi-wire E-stop cable 186. Power line 1 of cable 186 routes E-stop control power (e.g., 24 VDC) to control box 30a to activate switch 172 of control box 30a. With switch 172 activated, outgoing power line 158 of circuit segment 152 is coupled to and energized by the power supply (e.g., supply 49 of FIG. 2) of control box 30a. Energized line 158 activates switch 176 of control box 30b, thereby coupling outgoing line 158 of circuit segment 154 to the power supply of control box 30b. Energized line 158 activates switch 180 of control box 30c, thereby energizing outgoing line 1 with the power supply of circuit box 30c. Energized line 1 is connected to line 4 with end cap 164, as described herein, and line 4 activates switch 182 of control box 30c to thereby couple outgoing line 166 of circuit segment 154 to the power supply of control box 30c. Energized line 166 of segment 154 activates switch 178 of control box 30b to couple outgoing line 166 of circuit segment 152 to the power supply of control box 30b. Energized line 166 of segment 152 activates switch 174 of control box 30a, and outgoing line 4 is powered by the power supply of control box 30a. Line 4 is routed back to a controller, such as PLC 12 of FIG. 2 or other suitable E-stop controller, to complete the E-stop circuit 150. In one embodiment, the connection of line 4 at PLC 12 is used to monitor the status of the E-stop circuit 150. Additional control boxes 30 may be connected to E-stop circuit 150 between control box 30a and the E-stop controller. Additional control boxes 30 may also be inserted between control box 30c and end cap 164 with additional cables 186 connecting the control boxes 30.

Upon any of the safety devices of E-stop circuit 150 (e.g., devices 156, 160) being actuated, the circuit 150 is interrupted causing each switch (e.g., switches 172-182) to change states. For example, upon actuation of safety device 160, line 158 is de-energized at control box 30c and line 166 is de-energized at control box 30b. As a result, switches 172-182 change states due to the interruption in the circuit 150. As such, the E-stop controller (e.g., PLC 12 of FIG. 2) detects the actuation of the safety device 160 based on a detection of an incomplete E-stop circuit 150 at line 4. Control boxes 30 are configured to remove power to one or more of the controlled output devices 16 (FIG. 2) upon the detection of the E-stop circuit 150 being interrupted based on the state of the safety switches of the respective control box 30. For example, in one embodiment, the motor controller 40 of motor box 32 (FIG. 2) is tied to the E-stop switches of the respective control box 30 such that motor controller 40 is disabled when the E-stop circuit 150 is tripped.

In one embodiment, E-stop circuit 150 includes branch circuits that route the E-stop power lines to control modules 14 (FIG. 2) located throughout the material handling system. In particular, portions of E-stop circuit 150 may branch off to connect to control modules 14 on branches or other portions of the material handling system, such as to control modules 14 on a conveyor belt, for example. The E-stop branch circuits described herein are operative to route the E-stop circuit 150 to and from these control modules 14 using circuit segments (described herein) while maintaining the series configuration of the circuit 150. In the illustrated embodiment, each branch circuit includes all supply and return E-stop wiring in a single series connection of multi-wire cabling.

Figure 8:
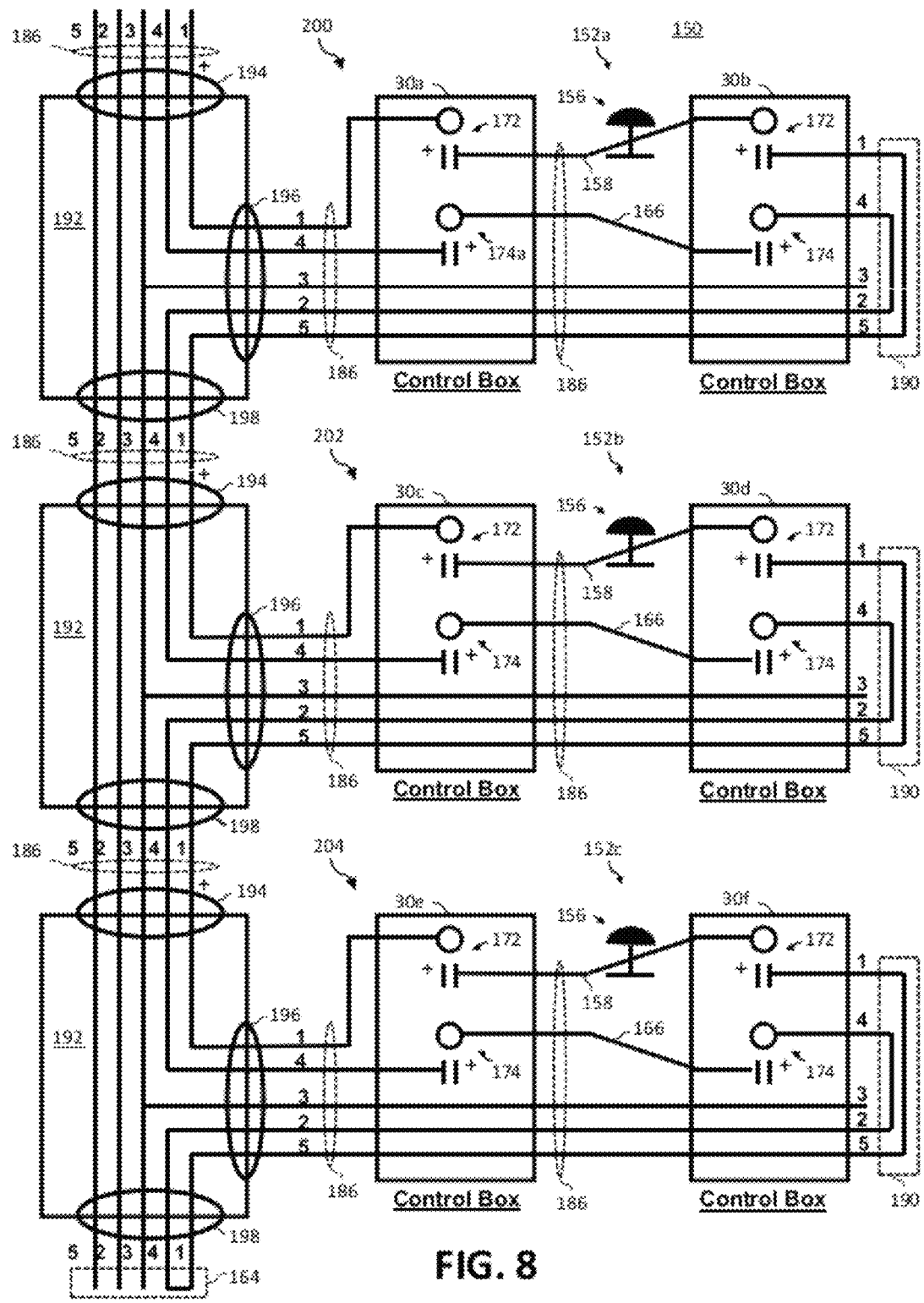
FIG. 8 illustrates an exemplary branch circuit configuration of the safety circuit of FIG. 7 including an end cap and a terminating end cap.

FIG. 8 illustrates an exemplary E-stop branch circuit configuration that includes several E-stop junction boxes 192 configured to route the E-stop lines to E-stop branch circuits 200, 202, 204. Each control box 30a-30f and circuit segment 152a-152c of branch circuits 200, 202, 204 operates as described herein with respect to FIG. 7. Each junction box 192 includes an input port or connector 194 and a branch port or connector 196 each configured to mate with corresponding connectors of cables 186. In one embodiment, connectors 194, 196 are M12 connectors, although other types of connectors may be provided. Lines 1-5 are routed to connector 194 of junction box 192 of branch circuit 200 from another portion of E-stop circuit 150 via a cable 186. In the illustrated embodiment, lines 1-5 are routed to junction box 192 of branch circuit 200 from a receptacle 70 (see FIG. 3) of a control module 14, such as the first control module 14 in the series of the control system 10. In this embodiment, line 1 is provided constant power (e.g., 24 VDC) from the receptacle 70 to start the E-stop safety loop to the branches 200, 202, 204 and line 4 is connected to an input at receptacle 70 to monitor the E-stop loop feedback at the E-stop controller, as described herein. In alternative embodiments, lines 1-5 are routed to junction box 192 of branch circuit 200 from another control box 30, a main controller (e.g. PLC 12 of FIG. 2), or other suitable E-stop circuit device. Junction box 192 of branch circuit 200 routes supply power line 1 to branch connector 196, which is connected to control box 30a via a multi-wire cable 186. Supply power line 1 controls switch 172 of control box 30a which provides power to switch 172 of control box 30b, as described herein. Similarly, line 4 is routed between connector 196 of junction box 192 and switch 174 of control box 30a. Lines 1-5 are similarly routed from the other junction boxes 192 to the respective branch circuits 202, 204.

Each branch circuit 200, 202, 204 of FIG. 8 further includes a branch end cap or plug 190, which includes a jumper plug or other suitable connector. End cap 190 is configured to couple to a corresponding output port of a control box 30, illustratively control boxes 30b, 30d, 30f, that is also configured to receive an end connector of a power cable 186. End cap 190, which is connected at the last control box 30 of each branch circuit 200, 202, 204, is operative to route the supply and return power lines 1, 4 back to the respective junction box 192 by connecting the power lines 1 and 4 to respective lines 5 and 2. At junction boxes 192 of branch circuits 200, 202, an output port 198 (e.g., M12 connector 198) of each junction box 192 is coupled to the input port or connector 194 of the next respective branch circuit 202, 204, i.e., via a cable 186. As such, the outgoing power lines 5 and 2 of branch circuit 200 are coupled to the respective power lines 1 and 4 that are routed to the control boxes 30c, 30d of branch circuit 202. Similarly, the outgoing power lines 5 and 2 of branch circuit 202 are coupled to the respective power lines 1 and 4 that are routed to the control boxes 30e, 30f of branch circuit 204.

At junction box 192 of branch circuit 204, an end cap 164 is connected to the output port 198 such that the supply and return power lines 1, 4 of branch circuit 204 are connected together with terminating end cap 164 to complete the E-stop circuit 150 and to route (via line 4) the return power back through the control boxes 30 on the circuit 150 to the PLC 12 (FIG. 2). End cap 164 may alternatively be coupled to an output port of the last control box 30f of the last branch circuit 204 in place of the end cap 190. End cap 164 is utilized as a termination plug in that it serves to complete the E-stop circuit 150 at the last control box 30 or junction box 192 of the circuit 150 or of the connected branch circuits 200, 202, 204. In one embodiment, a single end cap 164 is required for the entire E-stop circuit 150, although other configurations may require additional end caps 164.

An exemplary wiring diagram 270 and pin schematic 272 of branch end cap 190 are illustrated in FIG. 10B. In FIG. 10B, end cap 190 includes five pins (1, 2, 3, 4, 5) that connect to respective lines 1, 2, 3, 4, 5 of FIG. 8. The voltage from line 1 of FIG. 8 is received by end cap 190 at pin 1 and is routed to pin 5 and to return line 5 of FIG. 8. Similarly, the return power or signal from line 2 of FIG. 8 is received by end cap 190 at pin 2 and is routed to pin 4 and to return line 4 of FIG. 8.

In the illustrated embodiment, lines 1-5 of E-stop circuit 150 illustrated in FIGS. 7-8 are routed between control boxes 30, safety devices 156, 160, junction boxes 192, and other E-stop devices on circuit 150 using multi-wire cables 186. Each cable 186 includes end connectors that are adapted to couple to corresponding ports of the devices on the E-stop circuit 150. In one embodiment, the cable connectors are quick-disconnect M12 connectors, although other types of connectors may be provided. For example, referring to FIG. 9, an exemplary portion of E-stop circuit 150 is illustrated with exemplary E-stop cables 186 and cable connectors 210, 212. E-stop cables 186*a* and 186*b* are connected between control boxes 30*a*, 30*b*, while E-stop cable 186*c* is connected to an input port of control box 30*a* and E-stop cable 186*d* is connected at an output port of control box 30*b*. Cable 186*a* is routed from control box 30*a* to safety device 156, and cable 186*b* is routed from safety device 156 to control box 30*b*. Cables 186*a*, 186*b* include the power wires 158, 166, i.e., lines 1 and 4, as well as lines 2, 3, 5 described in FIGS. 7-8. Cables 186*a*, 186*b* each include end connectors 210, 212 for connecting to the respective ports of control boxes 30*a*, 30*b* and to safety device 156. In one embodiment, connector 210 includes one of a male connector and a female connector, and connector 212 includes the other of a male connector and a female connector, although connectors 210, 212 alternatively may be the same connector type.

Figure 9:
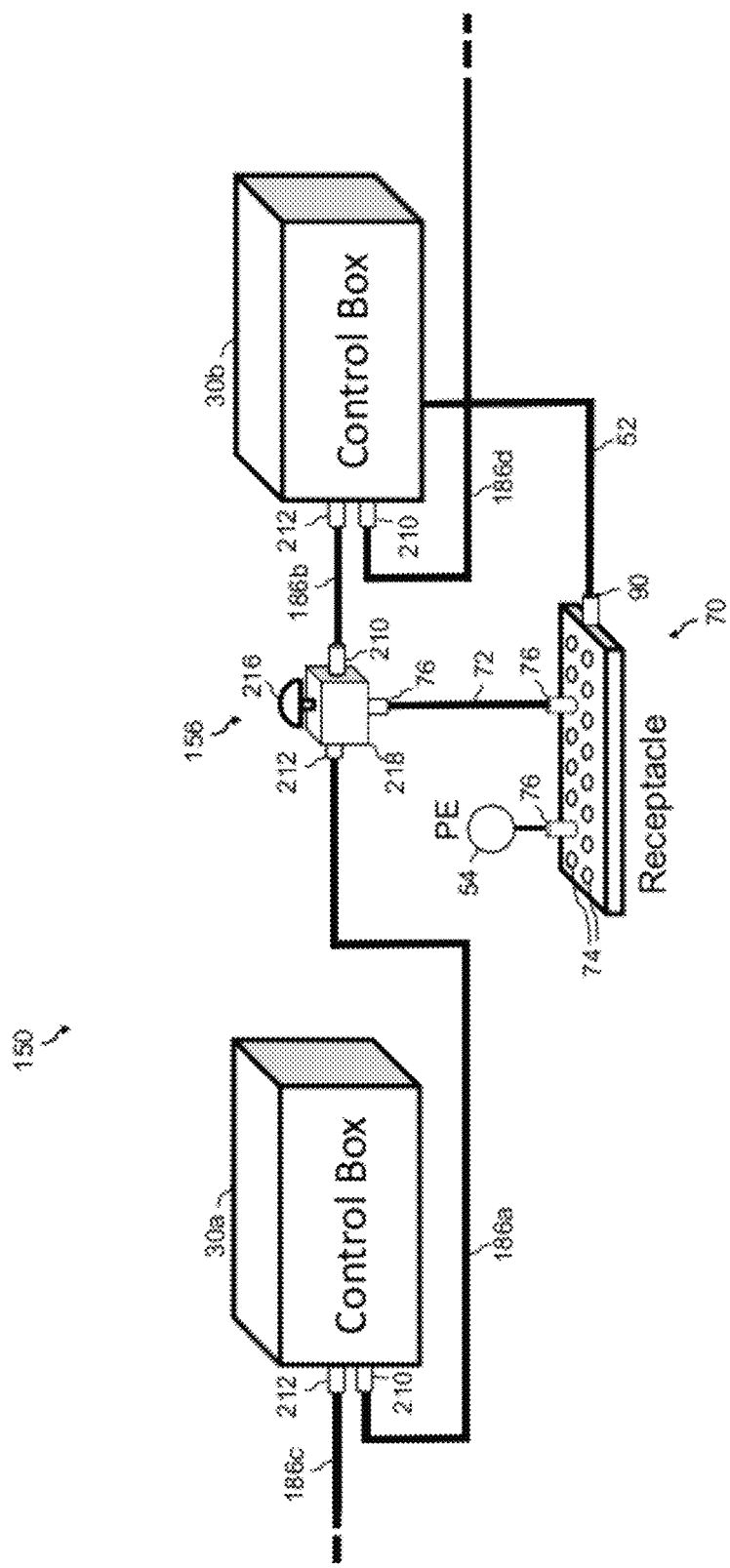
FIG. 9 illustrates the safety circuit of FIG. 7 including a safety device coupled to the receptacle of FIG. 3.

Safety device 156 of FIG. 9 illustratively includes a push-button 216 as an actuator and an E-stop box or enclosure 218 that houses the internal circuitry and contacts of the device 156. Box 218 illustratively includes two ports for connecting to input and output cables 186 and a third port for connecting to a cable 72 that connects safety device 156 to receptacle 70, described in FIG. 3. In one embodiment, cable 72 from safety device 156 provides the status of the specific E-stop condition (i.e., which safety device is tripped) to the adjacent control box 30*b* which routes the status information to PLC 12 for display on HMI 68 (see FIG. 2) to operators or end users.

In one embodiment, E-stop switches (e.g., 172-182 of FIG. 7) in the control boxes 30 are safety relays that are operative at lower voltages than the standard operating voltage of the E-stop circuit 150. For example, in an E-stop circuit 150 operating at 24 VDC, the safety relays of control boxes 30 are actuated at voltages as low as about 10 VDC. As such, if the operating voltage on E-stop circuit 150 is reduced, such as due to a long cable run distance, for example, the relays still operate properly.

In one embodiment, E-stop circuit 150 is rated Category 0 per NFPA79. In another embodiment, E-stop circuit 150 is rated Category 1 per EN954-1, although other suitable ratings may be provided.

As described herein and illustrated in FIG. 7, the supply power line 1 of circuit segment 152 is powered by a power supply 49 (see FIG. 2) of control box 30*a*, and the supply power line of circuit segment 154 is powered by a power supply 49 of control box 30*b*. Similarly, the return power lines 4 of circuit segments 152, 154 are powered by power supplies 49 of control boxes 30*b*, 30*c*, respectively. As such, each circuit segment 152, 154 is a separately powered entity that provides a "plug and play" configuration. In particular, when an additional control module 14 is connected to control system 10 (FIG. 1), as described herein, an additional E-stop circuit segment may be connected from an adjacent control module 14 or E-stop junction box 192 to the additional control module 14 without wiring back to the PLC panel 64 (FIG. 2). As such, as additional zones 24 (FIG. 1) are added to the material handling system (e.g. a new section of a conveyor belt, etc.), the E-stop circuit 150 is expandable with the control system 10 by connecting an additional circuit segment between the additional control module 14 and a node of the existing daisy chained, segmented E-stop circuit 150. As such, wiring from the additional E-stop circuits 150 back to the E-stop controller (e.g., PLC 12) is not required. Accordingly, long wire and conduit runs for E-stop circuit 150 back to the main panel is reduced or eliminated. In one embodiment, the segmented configuration of E-stop circuit 150 connected control module 14 to control module 14, as described herein, serves to reduce the likelihood of large voltage drops in the circuit 150.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A control module for controlling an output device in a control system, the control module including:

a first enclosure containing a plurality of control terminals configured to carry control signals and a plurality of input/output (I/O) terminals for electrically connecting at least one low voltage I/O device;

a second enclosure containing a controller operative to control operation of at least one high voltage output device based on the control signals, the at least one high voltage output device being electrically connected to at least one power connection housed in the second enclosure; and a communication interface configured to communicate the control signals from the control terminals of the first enclosure to the controller of the second enclosure to control the at least one high voltage output device, a maximum voltage in the first enclosure being less than or equal to a threshold voltage level, and a maximum voltage in the second enclosure being greater than the threshold voltage level, at least one of the plurality of I/O terminals in the first enclosure providing power to the at least one low voltage I/O device at a voltage level less than the threshold voltage level, and the at least one power connection in the second enclosure providing power to the at least one high voltage output device at a voltage level greater than the threshold voltage level.

2. The control module of claim 1, wherein the first enclosure contains only components having a voltage level that is less than or equal to the threshold voltage level, and the second enclosure contains components having a voltage level that is greater than the threshold voltage level.

3. The control module of claim 2, wherein the threshold voltage level is about 50 volts, and the maximum voltage in the second enclosure is greater than or equal to 200 volts.

4. The control module of claim 2, wherein the threshold voltage level is about 24 volts.

5. The control module of claim 1, wherein the communication interface includes at least one communication module operatively coupled to the plurality of control terminals, and the at least one communication module is housed in the first enclosure.

6. The control module of claim 5, wherein the at least one communication module is operative to control communication between a main controller of the control system and the controller of the second enclosure to control the at least one high voltage output device, the at least one communication module communicates the control signals from the first enclosure to the controller of the second enclosure based on control signals received from the main controller, and the main controller is located external to the first and second enclosures.

7. The control module of claim 1, wherein the second enclosure further contains a power supply that is operative to provide power to the first enclosure, the power provided to the first enclosure from the power supply having a voltage level that is less than or equal to the threshold voltage level.

8. The control module of claim 1, wherein the at least one high voltage output device includes a motor, and the controller includes a motor starter operative to drive the motor based on control signals provided with the control terminals of the first enclosure.

9. A distributed control system including:
a main panel including a main controller;
a plurality of control modules physically remote from and in electrical communication with the main controller and each operative to control at least one high voltage output device of the control system, each control module including
a first enclosure that houses a plurality of control terminals configured to carry control signals and a plurality of input/output (I/O) terminals for electrically connecting a plurality of low voltage I/O devices,
a second enclosure that houses a controller operative to control the at least one high voltage output device based on the control signals, the at least one high voltage output device being electrically connected to at least one power connection housed in the second enclosure, and
a communication interface operative to communicate the control signals from the control terminals of the first enclosure to the controller of the second enclosure to control the at least one high voltage output device, a maximum voltage in the first enclosure being less than or equal to a threshold voltage level, and a maximum voltage in the second enclosure being greater than the threshold voltage level, the plurality of I/O connections in the first enclosure providing power to the plurality of low voltage I/O devices at a voltage level less than the threshold voltage level, and the at least one power connection in the second enclosure providing power to the at least one high voltage output device at a voltage level greater than the threshold voltage level.

10. The control system of claim 9, wherein the threshold voltage level is about 50 volts, and the maximum voltage in the second enclosure is greater than or equal to 200 volts.

11. The control system of claim 9, wherein the communication interface includes at least one communication module housed in the first enclosure and operatively coupled to the plurality of control terminals, the at least one communication module is operative to control communication between the main controller of the control system and the controller of the second enclosure to control the at least one high voltage output device, and the at least one communication module communicates the control signals from the first enclosure to the controller of the second enclosure based on control signals received from the main controller.

12. The control system of claim 11, the plurality of low voltage I/O devices being electrically connected to the plurality of I/O terminals of the first enclosure and operating at a voltage level that is less than or equal to the threshold voltage level, the plurality of low voltage I/O devices providing electrical feedback to the main controller via the at least one communication module.

13. The control system of claim 9, wherein the second enclosure further houses a power supply that is operative to provide power to the first enclosure, the power provided to the first enclosure from the power supply having a voltage level that is less than or equal to the threshold voltage level.

14. The control system of claim 9, wherein the at least one high voltage output device includes at least one motor configured to operate at a voltage level greater than the threshold voltage level, and the controller includes at least one motor starter operative to drive the at least one motor based on control signals provided with the control terminals of the first enclosure.

15. A control system including:
a first control module operative to control an output device of the control system;
a second control module operative to control an output device of the control system, the first and second control modules each including a power supply;
a safety circuit including a plurality of circuit segments, each circuit segment including an electrical cable and at least one safety device coupled to the electrical cable, the at least one safety device being operative to disable an operation of the control system, a first circuit segment being powered by the power supply of the first control module and being coupled to the second control module to control power to the output device controlled by the second control module, a second circuit segment being powered by the power supply of the second control module.

16. The control system of claim 15, further including a third control module operative to control an output device of the control system, the second circuit segment being coupled to the third control module to control power to the output device controlled by the third control module.

17. The control system of claim 16, wherein the plurality of circuit segments cooperate to provide a first power line and a second power line each coupled to at least one safety device and to the first, second, and third control modules, the safety circuit further includes an end cap coupled to a port of the third control module, and the end cap electrically connects the first power line to the second power line to complete the safety circuit.

18. The control system of claim 17, wherein the first and second power lines of the plurality of circuit segments are provided in a plurality of multi-wire cables, each multi-wire cable includes connectors adapted to couple to the at least one safety device and to the first, second, and third control modules, and the port of the third control module further being adapted to receive a connector of a multi-wire cable.

19. The control system of claim 15, wherein an actuation of the at least one safety device of the first circuit segment is operative to disable operation of the output device controlled by the second control module.

20. The control system of claim 15, wherein each circuit segment includes at least two power lines connected to the at least one safety device, and the first circuit segment includes a first power line that is powered by the power supply of the first control module and a second power line that is powered by the power supply of the second control module.

21. The control system of claim 15, wherein the second control module includes a switch connected to the first circuit segment, wherein when the first circuit segment is energized, the switch causes the second circuit segment to be connected to the power supply of the second control module.

22. The control system of claim 15, wherein each power supply of the first and second control modules is less than about 50 volts.

23. The control system of claim 15, the safety circuit further including a branch circuit having a junction box connected to the first control module, a third control module operative to control an output device of the control system, and a third circuit segment connecting the junction box to the third control module, the third circuit segment being powered by the power supply of the first control module and being coupled to the third control module to control power to the output device controlled by the third control module.

24. The control system of claim 23, wherein the plurality of circuit segments cooperate to provide a first power line and a second power line each coupled to at least one safety device and to the first, second, and third control modules, the safety circuit further includes an end cap coupled to at least one of the third control module and the junction box, and the end cap connects the first power line to the second power line to complete the safety circuit.

25. An emergency stop circuit connected to a plurality of control modules of a control system, the emergency stop circuit including:
    a first circuit segment including at least one safety device operative to disable an operation of the control system;
    a second circuit segment including at least one safety device operative to disable an operation of the control system, the second circuit segment being connected in series with the first circuit segment, the first circuit segment being coupled to and powered by a power supply of a first control module of the control system and the second circuit segment being coupled to and powered by a power supply of a second control module of the control system, the first circuit segment further being coupled to the second control module and being operative to enable and disable an operation of the second control module.

26. The emergency stop circuit of claim 25, wherein the second circuit segment is coupled to a third control module of the control system and is operative to enable and disable an operation of the third control module.

27. The emergency stop circuit of claim 26, wherein the first and second circuit segments cooperate to provide a first power line and a second power line each coupled to at least one safety device and to the first, second, and third control modules, the safety circuit further includes an end cap coupled to the third control module, and the end cap connects the first power line to the second power line to complete the emergency stop circuit.

28. The emergency stop circuit of claim 25, wherein the plurality of control modules are operative to control at least one output device, the at least one safety device of the first and second control segments being operative to disable operation of the at least one output device.

29. The emergency stop circuit of claim 25, wherein the second control module includes a switch connected to the first circuit segment, wherein when the first circuit segment is energized, the switch causes the second circuit segment to be connected to the power supply of the second control module.

30. The control module of claim 5, wherein the at least one low voltage I/O device includes a plurality of low voltage I/O devices electrically connected to the plurality of I/O terminals, and the communication module routes controls and feedback between the main controller and the plurality of low voltage I/O devices.

\* \* \* \* \*